Oct. 15, 1968 H. VERDIER 3,405,755
VEHICLE WHEELS
Filed July 5, 1966
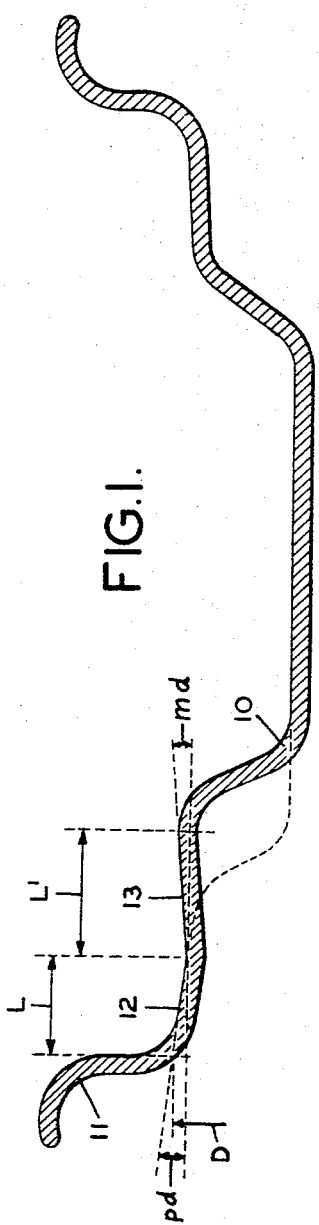
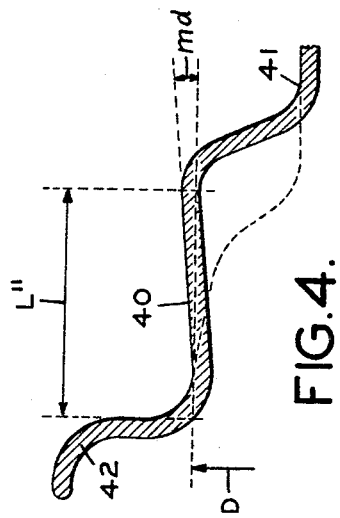
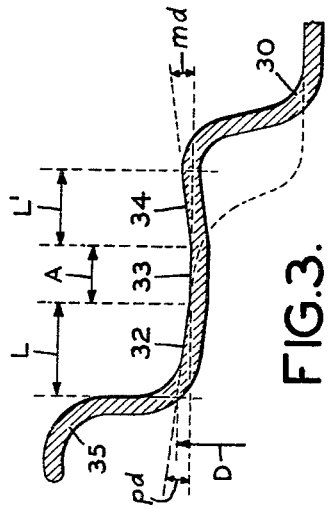
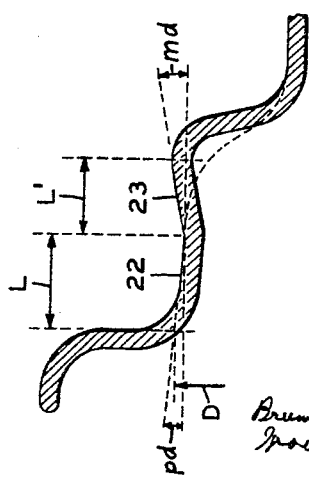
INVENTOR
HENRI VERDIER
BY
Brumbaugh, Free
Graves & Donohue
HIS ATTORNEYS

United States Patent Office 3,405,755
Patented Oct. 15, 1968

3,405,755
VEHICLE WHEELS
Henri Verdier, Beauregard-L'Eveque, Puy-de-Dome,
France, assignor to Compagnie Generale des Etablissements Michelin, raison sociale Michelin &
Cie, Clermont-Ferrand, Puy-de-Dome, France
Filed July 5, 1966, Ser. No. 562,807
Claims priority, application France, July 5, 1965,
23,556
8 Claims. (Cl. 152—381)

ABSTRACT OF THE DISCLOSURE

A vehicle wheel rim which is shaped so as to enhance the air tightness between the rim and the tire. The tightness is principally assured by compression of the rubber at the base of bead which is slightly smaller in diameter than the seat of the rim. The rim includes a prolongation of a bead seat which runs, at least in part, in a countersloped relation with the axial width of the bead seat portion.

The present invention relates to vehicle wheels for use with tubeless tires, and more particularly to wheel rims which enhance the air tightness between the rim and the tire.

Rims of vehicle wheels for tubeless tires have two inclined seats which engage the beads of the tire in wedging relation under the influence of the tire inflation pressure. Tightness is principally assured by compression of the rubber at the base of the bead which is slightly smaller in diameter than the seat on the rim. The conical shapes of the inclined seats of the rim and the bases of the tire bead, which may be either identical or different, assure progressive locking and seating.

Experience has shown that the degree of compression of the base of the bead may vary considerably, in accordance with circumstances. In particular, in case of a deflective stress exerted upon the tire, resulting, for example, from the centrifugal force, if a curve is taken at high speed, the compression at the base of the bead may be reduced to a point where on the wheel under the highest stress, a localized and momentary unseating or unwedging of the bead may occur so that it is pushed towards the inside of the rim. The unwedging of a bead causes a loss of pressure which, in turn, reduces the tightness of the bead against the seat and subsequent unseating occurs more easily if the tire is again subjected to a deflective stress. Thus, it is important that the rim has a structure which provides for resistance to bead-unseating to the highest possible degree. Resistance to unseating may be measured by determining the minimum inflation pressure sufficient to prevent unseating in the course of a test undertaken under controlled conditions whereby the tire is subjected to a controlled deflective stress.

Various means to improve resistance to unwedging or unseating, by giving the rim a suitable shape, are known. For example, it has been proposed to prevent the bead from being forced from its normal position, even only locally and momentarily, by providing the inclined seat with a raised portion forming an abutment, i.e., comprising a steep shoulder. With the best configuration provided heretofore, that is, a cylindrical abutment extending over considerable axial length, its effectiveness, though noticeable, is often found to be insufficient. For reasons which are not understood, the bead sometimes works itself loose more or less easily at high inflation pressures while in other cases, it works itself loose only at comparatively low inflation pressures. This abutment, known as a "flat hump," while effective, does not sufficiently improve the resistance to unseating of a bead.

Another solution consists in the addition of a cylindrical extension to the inclined bead seat inwardly of the seat toward the middle of the rim. If this cylindrical portion is of the same width or exceeds the axial width of the inclined seat, it contributes an appreciable improvement of the resistance against release of the bead. In practice, a cylindrical portion on one side only of the rim is provided and it is made at least double the axial width of the seat or the base of the bead, with seats inclined at an angle of 5° in the usual manner. However, this construction has its limitations. The inflation pressure must not fall too much below the normal pressure if unseating of the bead under average or severe conditions is to be avoided. Effectiveness of bead retention can be improved by enlarging the width of the bead-retaining cylindrical portion edge, but this is possible only within the limits of the available space in the rim. Beyond a certain width of the cylindrical portion no gain in effectiveness is obtained. Furthermore, with this solution, resistance to unseating of the bead varies less than proportionately to the deflective stress exerted to unseat the bead which rapidly reduces the margin of safety if the deflective stress increases.

The present invention relates to a rim with increased resistance to unseating of a tire bead, the structure of the rim not requiring its weight or size to be increased and in which excessive widening of one of its parts to the detriment of the others is avoided.

More particularly, in accordance with the invention, the new rim includes a prolongation of a bead seat by means of an inclined portion which runs, at least in part, in countersloped relation to the conventional seat, i.e., with a diameter increasing from the outside towards the inside, and extending over an axial width equalling $$\frac{p+n-1}{\sqrt{p+n+m+1}}L$$

whereby L indicates the axial width of the said seat, $p$ and $m$ are figures equalling, respectively, the ratio of inclination of the said seat and the ratio of the inclination of the inclined portion relative to the axis of the rim divided by the angle $d$ which has a value such that $\tan d = L/2D$, D being the diameter of the seat at the point farthest from the axis, and $n$ is a figure ranging from 0 to 25.

The above formula makes indirect use of an angle $d$, generally ranging from 1° to 2°, which is an almost invariable geometrical characteristic of both the rim and the tire inasmuch as for practical purposes one may put on the same denominator the axial width and the maximum diameter of the seat of the bead on the rim with the maximum diameter and axial width of the base of the bead on the tire. The two products $pd$ and $md$ are the slope of the seat and the slope of the edge relative to the axis of the rim. By definition, $m$ is positive. On the other hand, the above formula may be used with $p+$ or $-$; $p$ is positive if the seat is inclined in a customary manner with the diameter increasing from the inside towards the outside of the rim; it is negative in the opposite case, when both the seat and the edge are countersloped.

The figure $n$ may be 0 to 25. By preference, it should be as high as possible. However, it may also be zero or very close to zero. Normally, the greater the value for $n$, with the other parameters not varying, the greater the width of the countersloped bead-retaining portion of the rim and, likewise, the greater the resistance to unwedging and the width of the rim.

By way of example: If $d$ is selected to be 1°15', the bead seats are inclined at the usual angle of 5°, which corresponds to $p=4$, and the countersloped bead-retaining portion is likewise inclined at 5° ($m=4$), the bead-retaining portion must have a width of $$\frac{3+n}{5+\sqrt{n+4}}L$$

i.e., $3/7L$ for $n=0$; $L$ for $n=5$; $5/3L$ for $n=12$, etc. By comparison, a cylindrical bead-retaining portion would have to have a width close to $L$, $2L$ or $3L$, respectively, to have any substantial effectiveness. This demonstrates the marked benefit due to use of the countersloped, bead-retaining portions, which enables the width of the inclined bead-retaining portion to be reduced in surprising ratio without diminishing its effectiveness, or to considerably increase its effectiveness with the same overall dimensions, or also, to improve both effectiveness and overall dimensions but to a lesser degree.

By preference, it is advisable to chose $n$, i.e., the axial width of the bead-retaining portion beyond its minimum valve, in such a manner that the diameter of the bead-retaining portion at the point farthest removed from the axis will not render mounting or removal of the tire too difficult. Generally speaking, $n$ may be chosen in such a manner that the axial width does not substantially exceed $$\frac{p}{m}L$$

i.e., that the maximum diameter of the countersloped bead-retaining portion does not exceed $D$, or exceeds it only slightly.

As regards the inclination of the countersloped bead-retaining portion, it is preferable that it be not much different from the inclination of the seats. By preference, its slope will be chosen from one-half to double the inclination of the seats, and specifically close to such inclination. Generally speaking, it is preferable that the maximum inclination of the bead-retaining portion be less than 20°, preferably less than 15°. If the edge is given too steep a pitch, a discontinuous structure or an abutment is approached which is not effective in certain cases.

If the bead-retaining portion is given a very slight inclination, it is necessary to increase its axial width in order to preserve the same effectiveness. At the limit with $m=0$, a cylindrical zone is provided. The equation set forth above requires a width of $(\sqrt{p+n}-1)L$. However, it is possible to partially compensate the increase of width by reducing the slope of the seats, i.e., the figure $p$. Therefore, in order to assure an appreciable gain, the bead-retaining portion is given a minimum inclination of 1°, but it may be less than 1° if the seat itself is only slightly inclined, for example, from 0 to 4°.

For bead seats inclined at an angle of 5°, the bead-retaining portion in practice should have an inclination between about 2°30' and 20°. With seats inclined at less than 5°, the bead-retaining portion may be inclined at less than 2° and even practically cylindrical, thus having an inclination ranging from 0° to 20°.

With regard to the inclination of the seats, it has become a custom to select a value of 5°, i.e., actually ranging from 4° to 6°, taking into consideration the tolerances in manufacture. However, it is possible to have seats inclined less than 5°, and even countersloped seats, i.e., to give $p$ a value which is close to zero or negative. It should be understood that such a choice should not be accompanied by a reduction of the nominal diameter of the rim, i.e., the diameter at the foot of the edge of the rim. If the seat is slightly inclined, cylindrical or counter-sloped, the base of the bead may be more compressed in the region of the tip than that of the heel of the bead.

The axial width of the bead seats should not be appreciably greater than the axial width of the bead of the tire. In fact, it is preferable to provide an axial width of the seat which is slightly less than the axial width of the base of the bead.

For a better understanding of the present invention, reference may be had to the accompanying drawings, in which—

FIGURE 1 is a view in cross-section of a portion of a rim embodying the present invention;

FIGURE 2 is a view in partial cross-section of a modified form of rim embodying the invention;

FIGURE 3 is a view in cross-section of a portion of another modification of the rim embodying the present invention; and FIGURE 4 is a view in cross-section of a portion of a further embodiment of the rim.

The form of rim illustrated in FIGURE 1 includes a drop center base 10 having a rim flange 11 thereon and a bead seat 12 which is inclined for proper wedging engagement with the bead on a tire. The rim shown is a 5J x 15 type with a diameter at the outer edge of the bead seat 12 of 380 mm.

In accordance with the invention, inwardly of the bead seat 12 is a counter-sloped, bead-retaining portion or zone 13 which has a width $L'$ which may be narrower than, equal to, or wider than the width of the bead seat $L$ within the limits established by the equation $$\frac{p+n-1}{\sqrt{p+n+m+1}}L$$

The angle of inclination of the bead seat 12 is indicated as $pd$ while the angle of the counter-sloped, bead-retaining zone 13 is indicated as $md$. In the specific example shown in FIGURE 1, the inclination of the seat, that is, the angle $pd$, is 5° and the seat has a width $L$ of 13 mm. The seat 12 extends into the bead-retaining portion 13 which is inclined at an angle of 4° and has a working width of $L'$, that is, approximately 17 mm. With a diameter $D$ of 380 mm. and a width $L$ of 13 mm., the angle $d$, calculated on the basis of tan $d=L/2D$, is very close to 1°. The values of $p$ and $m$ are in this case 5° and 4°, respectively, giving the bead-retaining portion 13 an inclination of 4° (angle $md$) and an axial width $L'$ of 17 mm. With these values $n$ is close to 7.

Bead unseating tests conducted with the same vehicle and under the same working conditions with rims measuring 5J x 15 and having a working width for supporting the bead which is identical in width and diameter at an axial distance of 8 mm. from the rim flange 11 have shown that bead loosening occurs at an inflation pressure which equals or is less than the following:

|  | Bars |
|---|---|
| Ordinary symmetric rim represented by the dash lines in FIGURE 1 | 1.2 |
| A rim with a short axial abutment as provided heretofore in the prior art | 1.0 |
| A rim with a long axial abutment | 0.9 |
| A rim with a cylindrical portion adjacent the bead seat | 0.9 |
| A rim as shown in FIGURE 1 | 0.8 |

From these tests it is evident that if the bead-retaining zone adjacent the bead seat is given a slight counter-slope, an appreciable improvement is obtained.

In the modification shown in FIGURE 2, the angles $pd$ and $md$ of the bead seat 22 and the bead-retaining portion 23 are 5° and 10°, respectively. In this modification, the width of the bead seat is 13 mm. while the width of the bead-retaining portion of $L'$ is 8 mm. In this case, with the diameter $D$ being 380 mm., the value of $n$ which was chosen was 4.

In the modification shown in FIGURE 3, the rim 30 has a bead seat 32, a cylindrical portion 33 adjacent thereto and a counter-sloped, bead-retaining portion 34 arranged inwardly of the rim flange 35. In this modification, the angles $pd$ and $md$ are both 5° and the widths $L$, $A$ and $L'$ are 13, 8 and 9 mm., respectively. The value of the variable $n$ in determining the width of the bead-retaining portion L' is about 4 for a rim diameter D of 380 mm.

The modified form of rim disclosed in FIGURE 4 has a bead seat and the counter-sloped, bead-retaining portion merged into a single wide seat 40 having a width L'' which is substantially equal to the combined widths L and L' of FIGURE 1, namely 30 mm. The inclined portion 40 extends at a constant angle from the drop center portion 41 of the rim to the rim flange 42 at an angle $md$ of 2°. This modification differs from those in FIGURES 1 to 3 in that in this case $-p$ is equal to $m$ with the axial width of the seat proper being equal to the axial width of the bead. The bead-retaining portion of the surface 40 is the difference between L' and the width of the bead.

Other variations of the arrangement of the bead seat and the bead-retaining portion are within the scope of the invention. For example, the invention also includes combinations of conical and cylindrical surfaces, and the bead seat and bead-retaining zone may be merged on a gradual curve without any sharp angle therebetween. Moreover, the rim structure described is applicable to all sizes of wheels and rims therefor. Accordingly, the forms of the invention described above should be considered as illustrative of the invention defined in the following claims.

I claim:

1. A vehicle wheel rim having a rim base, rim flanges at its edges, and bead seat portions adjacent to said rim flanges and comprising a bead-retaining portion inwardly and forming a continuation of at least one of said bead seat portions having a diameter increasing from adjacent to said one bead seat portion toward the other rim flange and extending over an axial width of $$\frac{p+n-1}{\sqrt{p+n+m+1}}L$$

L being the axial width of the said one bead seat portion, $p$ being the ratio of the angle formed by the axis of the rim and said one bead seat portion to an angle $d$ selected so that $\tan d = L/2D$, D being the diameter of the said one bead seat portion at the point farthest removed from the axis, $m$ being the ratio of the angle formed by the axis of the rim and said bead-retaining portion to said angle $d$, $n$ being a figure from 0 to 25, and $m$ having a value such that the angle $md$ has a minimum value of 1°.

2. The rim set forth in claim 1 in which the inclination of said bead-retaining portion is between about one-half and double the inclination of said bead seat portion.

3. The rim set forth in claim 1 in which said bead seat portion is inclined at an angle of about 4° to 6° and the bead-retaining portion is inclined at an angle between about 2½° and 20°.

4. The rim set forth in claim 1 in which said bead seat is inclined at an angle of less than 5° and the bead-retaining portion is inclined at an angle between about 1° and 10°.

5. The rim set forth in claim 1 in which the inclination of the bead-retaining portion varies from edge to edge.

6. The rim set forth in claim 1 in which said bead seat portion and said bead-retaining portion are inclined in the same direction relative to the rim axis.

7. The rim set forth in claim 1 in which the width of said beat seat portion is less than the width of a tire bead to be mounted on said rim.

8. The rim set forth in claim 1 in which $n$ is a value such that the width of the bead-retaining portion is not substantially greater than the value $$\frac{p}{m}L$$

References Cited
UNITED STATES PATENTS

| | | | |
|---|---|---|---|
| 2,731,064 | 1/1956 | Powers | 152—381 XR |
| 2,868,259 | 1/1959 | Powers | 152—381 |
| 2,992,045 | 7/1961 | Martenet | 152—381 XR |

OTHER REFERENCES

The Tire and Rim Association, Inc., 1964–65 Yearbook, pp. 15–16.

ARTHUR L. LA POINT, *Primary Examiner.*

C. B. LYON, *Assistant Examiner.*